United States Patent
Lin et al.

(10) Patent No.: US 9,773,028 B2
(45) Date of Patent: Sep. 26, 2017

(54) MANIPULATING NON-SCHEMA ATTRIBUTES FOR OBJECTS IN A SCHEMA BASED DIRECTORY

(75) Inventors: Ken K. Lin, West Chester, PA (US); William A. Spencer, Westford, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 969 days.

(21) Appl. No.: 12/893,934

(22) Filed: Sep. 29, 2010

(65) Prior Publication Data

US 2012/0078905 A1    Mar. 29, 2012

(51) Int. Cl.
G06F 17/00    (2006.01)
G06F 17/30    (2006.01)

(52) U.S. Cl.
CPC .............................. *G06F 17/30292* (2013.01)

(58) Field of Classification Search
CPC ................................................ G06F 17/30292
See application file for complete search history.

(56) References Cited

U.S. PATENT DOCUMENTS

| | | | |
|---|---|---|---|
| 7,487,176 B2* | 2/2009 | MacLeod et al. | |
| 2003/0088654 A1* | 5/2003 | Good et al. | 709/223 |
| 2003/0105770 A1* | 6/2003 | MacLeod et al. | 707/103 R |
| 2003/0140308 A1 | 7/2003 | Murthy et al. | |
| 2008/0016122 A1 | 1/2008 | Liu et al. | |
| 2008/0147698 A1 | 6/2008 | Gustafsson et al. | |
| 2009/0063562 A1 | 3/2009 | Dinger et al. | |

FOREIGN PATENT DOCUMENTS

| | | |
|---|---|---|
| WO | WO03030031 | 4/2003 |
| WO | WO2009050167 | 4/2009 |

* cited by examiner

*Primary Examiner* — Mariela Reyes
*Assistant Examiner* — Mohsen Almani
(74) *Attorney, Agent, or Firm* — Erik K. Johnson; Edell, Shapiro & Finnan, LLC (57) ABSTRACT

Systems and methods for defining attributes for one or more entries in a computer implemented directory structure. The method comprises grouping a set of non-schema attributes associated with a directory entry into a multivalue schema attribute, wherein the multivalue attribute comprises values associated with each of the corresponding non-schema attributes grouped into the multivalue attribute; encoding at least one of the non-schema attributes into a string having one or more parts; and performing computing operations on the non-schema attributes in the directory entries based on content of the encoded strings defined in the multivalue attribute in which the respective non-schema attributes are grouped.

7 Claims, 5 Drawing Sheets

| Non-schema Attribute name | Value |
|---|---|
| FavoriteDrink | Water<br>Juice |
| FavoriteShow | 24 |
| FavoriteNumber | 18 |

Exemplary Multivalue Schema Attribute used to define:
Non-schema Attribute – String: "names:values"

ExtensibleAttributes: favoriteDrink:water
ExtensibleAttributes: favoriteDrink:juice
ExtensibleAttributes: favoriteShow:24
ExtensibleAttributes: favoriteNumber:18

FIG. 1

| Non-schema Attribute name | Value |
|---|---|
| FavoriteDrink | Water<br>Juice |
| FavoriteShow | 24 |
| FavoriteNumber | 18 |

Exemplary Multivalue Schema Attribute used to define:
Non-schema Attribute – String: "names:values"

ExtensibleAttributes: favoriteDrink:water
ExtensibleAttributes: favoriteDrink:juice
ExtensibleAttributes: favoriteShow:24
ExtensibleAttributes: favoriteNumber:18

MANIPULATING NON-SCHEMA ATTRIBUTES FOR OBJECTS IN A SCHEMA BASED DIRECTORY

COPYRIGHT & TRADEMARK NOTICES

A portion of the disclosure of this patent document may contain material, which is subject to copyright protection. Certain marks referenced herein may be common law or registered trademarks of the applicant, the assignee or third parties. Use of these marks is for providing an enabling disclosure by way of example and shall not be construed to exclusively limit the scope of the disclosed subject matter to material associated with such marks.

TECHNICAL FIELD

The disclosed subject matter relates generally to an object directory structure implemented in a computing environment and, more particularly, to a system and method for allowing non-schema attributes to be implemented or manipulated in a directory that enforces schema control on object attributes.

BACKGROUND

In computing, an object refers to a compilation of attributes (i.e., object elements) and the respective behaviors (i.e., methods or routines) applied to the attributes. An object may have one or more attributes, such as a name and a value. An object directory in a computing environment may be used to define the attributes associated with an object in a data structure referred to as a schema. The schema may also define the related hierarchy of the attributes for each object.

A directory uses objects to store and reference data in the directory. The schema defines the types of objects that are available to the directory service. The schema is stored in the schema partition, which is also defined as an object in the directory. The attributes and classes in a directory are stored in the schema partition as directory objects that are called schema objects.

When an application locates the schema in the directory, the application may read the schema to discover what types of objects and properties are available. Because the schema is stored in the directory, applications can locate the schema by using the same process used to locate any other object in the schema.

If an object attribute is not already defined in the directory's schema, then the directory administrator will have to add application specific attributes to the directory before the application can be successfully executed. That is, the schema needs to be extended to include the application specific object attributes before the application can use the attributes.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Systems and methods for defining attributes for one or more entries in a computer implemented directory structure. The method comprises grouping a set of non-schema attributes associated with a directory entry into a multivalue schema attribute, wherein the multivalue attribute comprises values associated with each of the corresponding non-schema attributes grouped into the multivalue attribute; encoding at least one of the non-schema attributes into a string having one or more parts; and performing computing operations on the non-schema attributes in the directory entries based on content of the encoded strings defined in the multivalue attribute in which the respective non-schema attributes are grouped.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
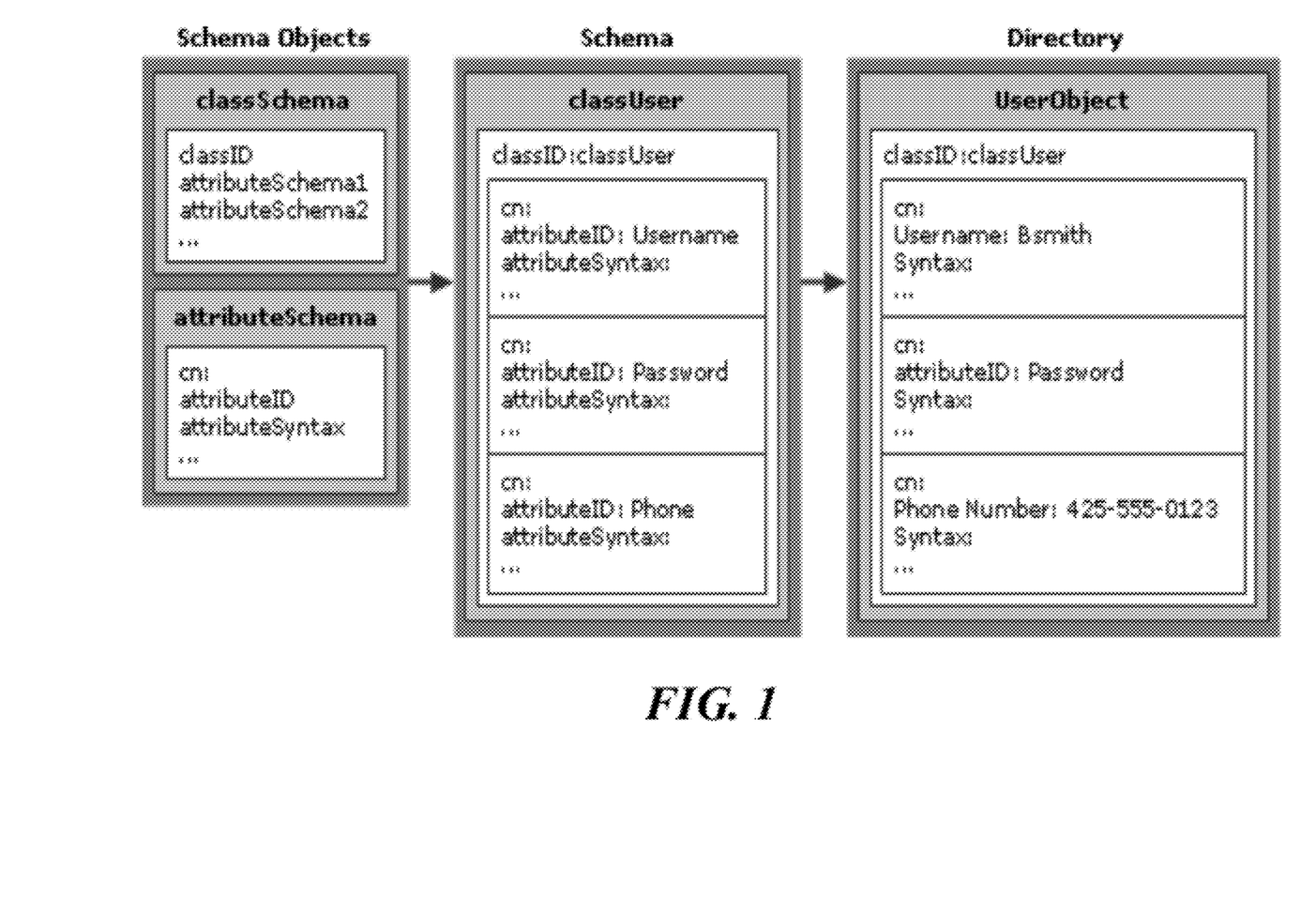
FIG. 1 illustrates exemplary schema objects used to define classes and attributes in a schema in accordance with one or more embodiments.

Referring to FIG. 1, exemplary schema objects are illustrated for defining classes and attributes in a schema in accordance with one or more embodiments, wherein classes in the schema are used to define objects in a directory. Depending on implementation, single value and multivalue attributes may be defined for objects in a directory schema.

As shown, a single value attribute comprises a single value, and a multivalue attribute comprises multiple values.

For example, a "password" attribute for a user object may include a single value (e.g., a password that is associated with the user account). As another example, a "memberOf" attribute may include multiple values (e.g., a list of the various groups in which the user account is a member). Each item in the list for the multivalue attribute "memberOf" is stored as a separate value. Whether or not an attribute is a single value or a multivalue may be indicated by, for example, a Boolean value or flag that is associated with the corresponding object class.

In one embodiment, object definitions are categorized into groups that are called classes. Classes act as blueprints that are used each time a new object is created. When a new object is created in the directory, the object's class determines the attributes that are associated with the new object, including the attributes that are required and the attributes are optional. In a schema based directory, predefined classes indicate the different object types utilized by the directory.

In the example shown in FIG. 1, for instance, when a new user account object is created in the directory, the new object's definition comes from the "classUser" class. The class dictates that the new account object has a user name attribute and a password attribute, and optionally it might have a phone number attribute, for example. The schema stores class information, but desirably the schema does not store the actual objects that are derived from a class.

For example, when a new user account object is created, that object is not stored in the schema. Directory looks up the user class in the schema and retrieves information regarding the object type and its associated attributes from the user class in the schema and uses that information to create the new user account object. When the new account is created, the data is stored in the new object, and the directory writes the new account information into the directory database.

In one embodiment, the schema provides a list of classes and attributes that can be used in the directory. During the installation of the directory, a default schema may be built to provide the classes that the directory needs to function. In one embodiment, administrators or developers may add additional classes or attributes to an existing object type to extend the schema. In certain instances, new attributes may be added to the schema without the involvement of the administrator as provided in further detail below.

For example, in one implementation, instead of extending the directory schema, new attributes may be added to an object in a schema based directory by encapsulating the new attributes into optionally a single multivalue schema attribute. In this manner, attributes that are not defined in the directory's schema may be added by way of a multivalue attribute that is, desirably, previously defined in the schema. In one embodiment, the new (i.e., non-schema) attributes may be encoded in the predefined multivalue schema attribute as character strings, for example.

The above implementation for inclusion of a predefined multivalue attribute in the schema eliminates the requirement for application of schema extensions to implement newly defined object attributes. In other words, the above mechanism allows for arbitrary attributes to be saved to a directory without having to extend the directory schema by way of submitting a request to a human administrator. Such implementation will allow ease of application development as well as ease of directory administration.

For example, Domino™ is a schema-free directory developed by International Business Machines (IBM)®. Domino may be utilized in association with a schema based directory (e.g., Lightweight Directory Access Protocol (LDAP)) to store Domino specific information. In one embodiment, if a third party application written to Domino is configured to extend the Domino information, then the directory administrators will need to be notified of the extensions that the application needs to make, and then extend the LDAP schema accordingly.

As provided in further detail below, the involvement of the administrator may not be needed, in some embodiments, if the new attributes are transparently provided to the application developers and users in advance by way of embedding the new attributes into a predefined multivalue attribute included in the directory schema. In this manner, the new (i.e., non-schema attributes) may be saved, retrieved and searched in a schema based directory. One or more of the non-schema attributes may be saved into, desirably, a single multivalue attribute—certain embodiments may be implemented to include more than a single (i.e., a plurality) of predefined multivalue attributes in which one or more non-schema attributes are stored.

Accordingly, in one embodiment, one or more multivalue attributes may be included the schema by default, wherein each multivalue attribute is associated with a plurality of non-schema attributes. The values assigned to each non-schema attribute of a multivalue attribute may be set to one or more values, for example. Said values may be updated to include an encoded string. One part (e.g., the head) of the string may provide the name assigned to a non-schema attribute. Another part (e.g., the tail) of the string may provide the value for the non-schema attribute.

Figure 2:
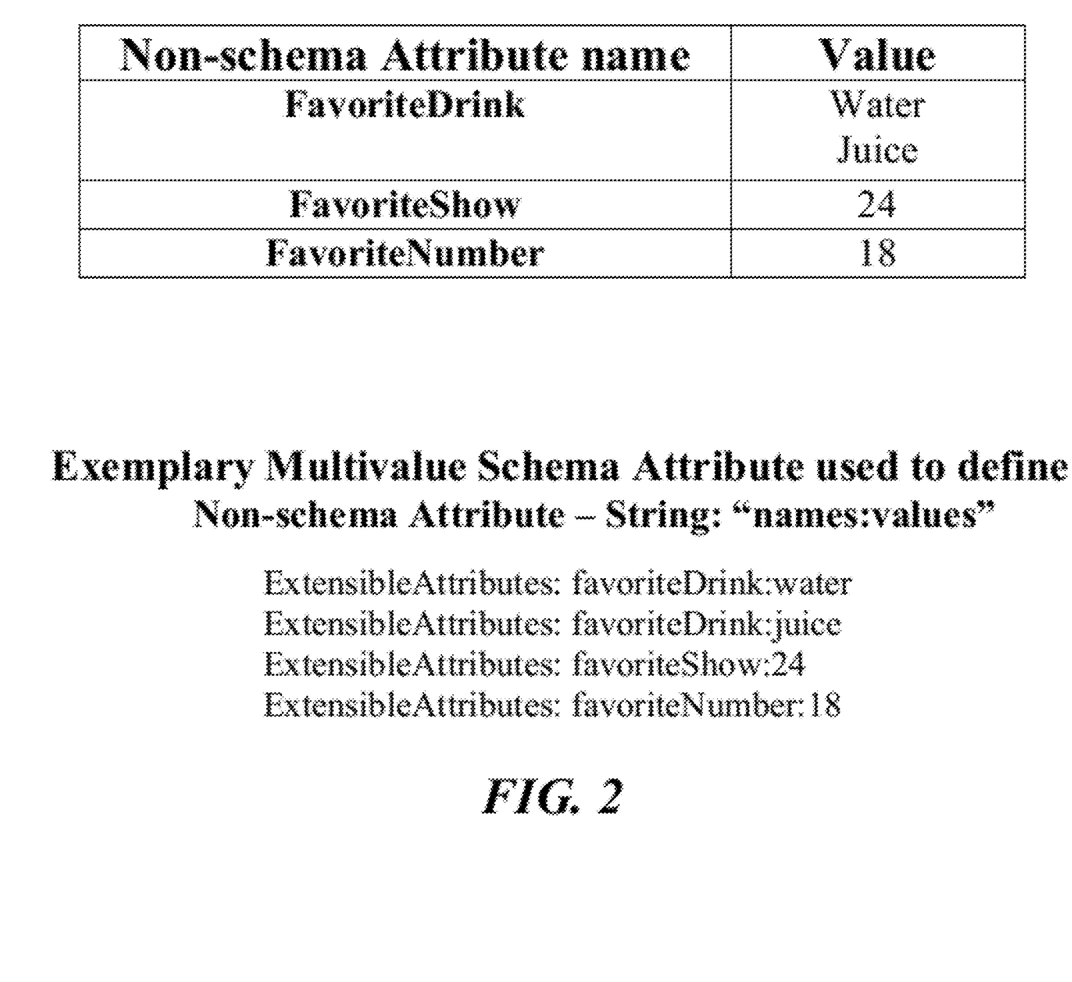
FIG. 2 illustrates exemplary non-schema attribute names and values, in accordance with one embodiment.

Referring to FIG. 2, exemplary non-schema attribute names and values are provided on the upper portion of the figure, and exemplary multivalue schema attributes used to define multiple non-schema attribute strings in the format "name:value" are illustrated on the lower portion of the figure. As shown, an attribute in the directory schema is predefined as "ExtensibleAttributes", for example, which is a multivalue attribute in the directory schema.

Figure 3:
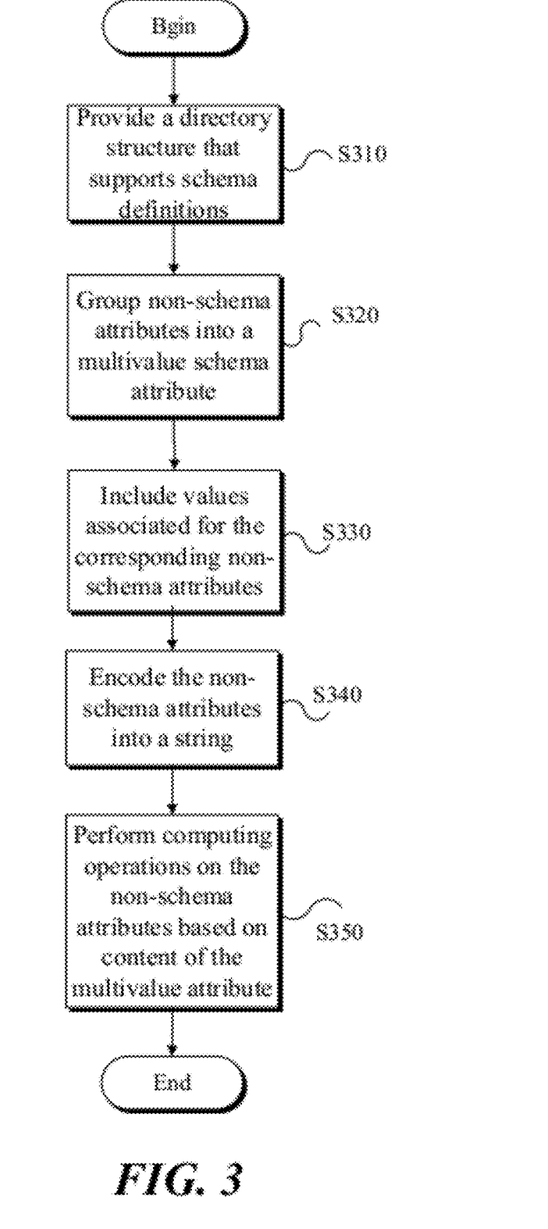
FIG. 3 is a flow diagram of an exemplary method for implementing and manipulating non-schema attributes, in accordance with one embodiment.

As provided in further detail below, and with reference to FIGS. 2 and 3, the non-schema attributes (e.g., FavoriteDrink, FavoriteShow, FavoriteNumber) may be encoded in the mutlivalue attribute (e.g., ExtensibleAttributes) by way of a service that implements this method and supports the storage, retrieval and searching for the non-schema attributes without the need for extending the schema in the traditional sense by way of a director administrator. To accomplish the above, we presume that a directory structure that supports schema definitions for one or more attributes is provided (310). A set of non-schema attributes associated with a directory entry are then grouped into a multivalue schema attribute (320).

Since the non-schema attributes are unsupported in the schema defined for the directory, and the schema attributes are supported in the schema defined for the directory, the multivalue attribute is configured to include values associated with one or more of the corresponding non-schema attributes grouped into the multivalue attribute (330). At least one of the non-schema attributes is then encoded into, for example, a string or other format representative of a value (340). Depending on implementation, a first part of the string may identify a name associated with the non-schema attribute and a second part of the string may provide a value associated with the non-schema attribute, for example.

Accordingly, computing operations may be performed on the non-schema attributes in the directory entries based on content defined in the multivalue attribute in which the respective non-schema attributes are grouped (350). Referring to the example in FIG. 2, ad hoc attributes may be stored in the predefined ExtensibleAttributes attribute, where the value of ExtendedAttributes is the representation of the arbitrary attribute-value pairs.

An object in the directory may thus be stored in the following LDAP Data Interchange Format (LDIF) syntax, for example:

DN: cn=klin,cn=users,dc=notesdev,dc=abcd,dc=com
objectClass: top
objectClass: person
objectClass: organizationalPerson
objectClass: abcd-ndAuxPerson
objectClass: user
cn: klin
givenName: Ken
sn: Lin
displayName: Ken Lin
ExtensibleAttributes: favoriteDrink:water
ExtensibleAttributes: favoriteDrink:Juice
ExtensibleAttributes: favoriteShow:26
ExtensibleAttributes: favoriteJpeg::123456789abcdef123456789abcdef
ExtensibleAttributes: favoriteNumber:18
ExtensibleAttributes: favoriteTime:20070502010203.0Z The LDIF format may be used to convey directory information, or a description of a set of changes made to directory entries. An LDIF file may include a series of records separated by line separators, for example. A record may comprise a sequence of lines defining a directory entry, or a sequence of lines defining a set of changes to a directory entry. An LDIF file may specify a set of directory entries, or a set of changes to be applied to directory entries, for example.

The attributes in the above example may be utilized in a variety of ways. For example, an attribute may be encoded in a search filter, so that the proper attribute value may be returned in response to a search query. In order to return the correct value, in one implementation, the attribute name is examined. If the name corresponds to an extensible attribute, then the directory service converts the result to a value that is understandable by the directory service. For example, if we have an attribute "favoriteNumber=1" then the extensible attributed will be set as "ExtensibleAttributes=favoriteNumber:1." The ExtensibleAttributes attribute may be indexed to optimize search performance.

In one implementation, the attribute value in the requested list of attributes to be returned is encoded. The directory service may detect that a submitted call is for a non-schema attribute, and request the corresponding ExtensibleAttribute attribute. The directory may then extract the corresponding attribute value from this attribute. It would be desirable to return correct values in the correct syntax, when the directory service caller may be passing arbitrary attributes in any particular format. As such, the requested attribute may be converted to the syntax of the ExtensibleAttribute attribute.

The directory service provider, in one embodiment, may track the mapping of syntax types, so that the syntax may be converted back to the syntax expected by the caller on retrieval. For example, if FavoriteShow is 26 and FavoriteNumber is 1, the caller might expect to get TEXT returned for FavoriteShow and expect to get a NUMBER returned for FavoriteNumber. The directory service provider may be thus implemented to remember the syntax mapping between the arbitrary attributes and the ExtensibleAttribute syntax so that the proper values are provided in the proper format.

The directory may remember the syntax mapping in several manners. In one exemplary embodiment, the directory may maintain an extensible schema object. This object may have a common name that is the extensible attribute name, and the format that is expected to be returned to the application caller. For example, if an object is named "favoriteShow", an object attribute may define a syntax for that object as TEXT. This object would provide a global mapping for one or more, or desirably all, favoriteShow attributes to be returned as a TEXT field. Advantageously, one or more sets (or desirably a single set) of objects may be utilized to define the syntax for one or more, or all, instances of an extensible attribute.

For example, the LDIF representation for the above-noted implementation may be constructed according to the following:

DN: cn=favoriteShow, cn=extAttrSchema
objectClass: top
objectClass: extAttrSyntax
cn: extAttrSchema
Syntax: TEXT In another embodiment, the syntax may be determined by maintaining another multivalue attribute in the object with the extensible attribute which defines the syntax of the extensible attributes. Accordingly, the syntax may be customized for an object which adds some application flexibility. Referring to the example above, the following construct may be used, for example:

DN: cn=klin,cn=users,dc=notesdev,dc=abcd,dc=com
objectClass: top
objectClass: person
objectClass: organizationalPerson
objectClass: abcd-ndAuxPerson
objectClass: user
cn: klin
givenName: Ken
sn: Lin
displayName: Ken Lin
ExtensibleAttributes: favoriteDrink:water
ExtensibleAttributes: favoriteDrink:Juice
ExtensibleAttributes: favoriteShow:26
ExtensibleAttributes: favoriteJpeg::123456789abcdef123456789abcdef
ExtensibleAttributes: favoriteNumber: 18
ExtensibleAttributes: favoriteTime:20070502010203.0Z
ExtensibleAttributeSyntax: favoriteDrink:TEXT
ExtensibleAttributeSyntax: favoriteShow: TEXT
ExtensibleAtrributeSyntax: favoriteJpeg:BINARY
ExtensibleAttributeSyntax: favoriteNumber:NUMBER
ExtensibleAttributeSyntax: favoriteTime:TIME It is noteworthy that in certain embodiments, when the caller updates an arbitrary attribute, the directory may change or replace the values that correspond to the attribute that was changed by the caller. In the case of LDAP, this may result in updating the respective attribute as a whole.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
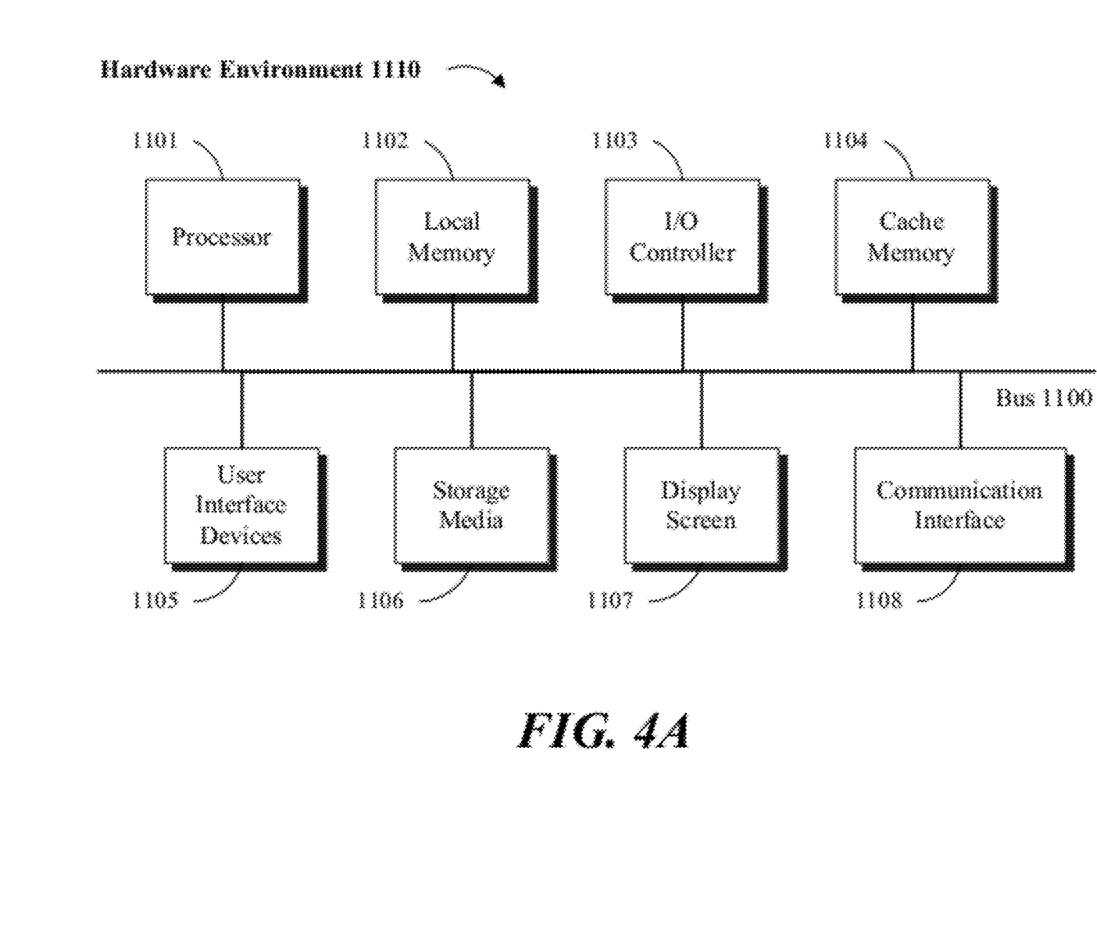
FIGS. 4A and 4B are block diagrams of hardware and software environments in which the disclosed systems and methods may operate, in accordance with one or more embodiments.
Figure 4B:
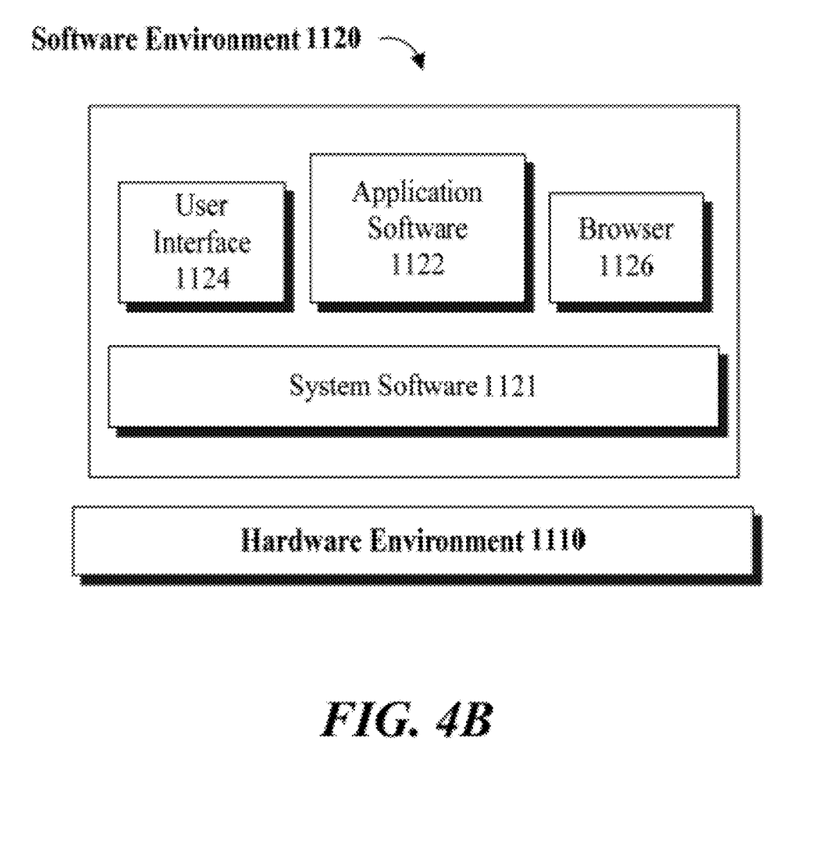

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method of implementing non-schema attributes for objects in a directory enforcing schema control on object attributes comprising:

storing a plurality of objects in a computer-implemented directory in accordance with a pre-defined schema for the directory, wherein the pre-defined schema specifies objects permitted in the directory and a plurality of attributes for the objects including one or more multi-value attributes, wherein each multivalue attribute includes an attribute name and multiple value portions each associated with that attribute name;

encoding in the form of a string each of a plurality of non-schema attributes for an object in the directory, wherein the non-schema attributes are not defined in the pre-defined schema and each encoded string for a non-schema attribute includes a first portion with a name for that non-schema attribute and a second portion with a value for that non-schema attribute, and wherein the plurality of non-schema attributes includes at least two different non-schema attributes with different names;

embedding each of the encoded strings for the non-schema attributes in a different value portion of a multivalue attribute of the object specified in the pre-defined schema without modification of the pre-defined schema to include definitions for the non-schema attributes, wherein the multivalue attribute contains the names and values for the plurality of non-schema attributes including the at least two different non-schema attributes, and wherein a syntax specifying a format for a corresponding non-schema attribute is maintained in a different multivalue attribute for the object in the pre-defined schema and the different multivalue attribute includes a name for the corresponding non-schema attribute and the syntax specifying a format for the corresponding non-schema attribute; and performing operations on the non-schema attributes of the object by accessing values of the non-schema attributes based on the names within the encoded strings in the value portions of the multivalue attribute.

2. The method of claim 1, wherein the directory utilizes a Lightweight Directory Access Protocol (LDAP).

3. The method of claim 1, wherein the syntax for the corresponding non-schema attribute is utilized to return results for a search query, such that the results for the search query include a value associated with the second portion of the encoded string for the corresponding non-schema attribute, when the search query matches content in the first portion of the encoded string for the corresponding non-schema attribute.

4. The method of claim 1, wherein an application specific non-schema attribute of the plurality of non-schema attributes is included in the directory based on values in the first portion and the second portion of the encoded string for the application specific non-schema attribute embedded into the multivalue attribute.

5. The method of claim 4, wherein the application specific non-schema attribute is included in the directory without requiring a directory administrator to extend the pre-defined schema by introducing new application specific non-schema attributes into the pre-defined schema.

6. A system for implementing non-schema attributes for objects in a directory enforcing schema control on object attributes comprising:

at least one processor configured to:
store a plurality of objects in a computer-implemented directory in accordance with a pre-defined schema for the directory, wherein the pre-defined schema specifies objects permitted in the directory and a plurality of attributes for the objects including one or more multivalue attributes, wherein each multivalue attribute includes an attribute name and multiple value portions each associated with that attribute name;

encode in the form of a string each of a plurality of non-schema attributes for an object in the directory, wherein the non-schema attributes are not defined in the pre-defined schema and each encoded string for a non-schema attribute includes a first portion with a name for that non-schema attribute and a second portion with a value for that non-schema attribute, and wherein the plurality of non-schema attributes includes at least two different non-schema attributes with different names;

embed each of the encoded strings for the non-schema attributes in a different value portion of a multivalue attribute of the object specified in the pre-defined schema without modification of the pre-defined schema to include definitions for the non-schema attributes, wherein the multivalue attribute contains the names and values for the plurality of non-schema attributes including the at least two different non-schema attributes, and wherein a syntax specifying a format for a corresponding non-schema attribute is maintained in a different multivalue attribute for the object in the pre-defined schema and the different multivalue attribute includes a name for the corresponding non-schema attribute and the syntax specifying a format for the corresponding non-schema attribute; and perform operations on the non-schema attributes of the object by accessing values of the non-schema attributes based on the names within the encoded strings in the value portions of the multivalue attribute.

7. A computer program product for implementing non-schema attributes for objects in a directory enforcing schema control on object attributes, the computer program product comprising:

a non-transitory data storage medium having a computer readable program, wherein the computer readable program when executed on a computer causes the computer to:
store a plurality of objects in a computer-implemented directory in accordance with a pre-defined schema for the directory, wherein the pre-defined schema specifies objects permitted in the directory and a plurality of attributes for the objects including one or more multivalue attributes, wherein each multivalue attribute includes an attribute name and multiple value portions each associated with that attribute name;

encode in the form of a string each of a plurality of non-schema attributes for an object in the directory, wherein the non-schema attributes are not defined in the pre-defined schema and each encoded string for a non-schema attribute includes a first portion with a name for that non-schema attribute and a second portion with a value for that non-schema attribute, and wherein the plurality of non-schema attributes includes at least two different non-schema attributes with different names;

embed each of the encoded strings for the non-schema attributes in a different value portion of a multivalue attribute of the object specified in the pre-defined schema without modification of the pre-defined schema to include definitions for the non-schema attributes, wherein the multivalue attribute contains the names and values for the plurality of non-schema attributes including the at least two different non-schema attributes, and wherein a syntax specifying a format for a corresponding non-schema attribute is maintained in a different multivalue attribute for the object in the pre-defined schema and the different multivalue attribute includes a name for the corresponding non-schema attribute and the syntax specifying a format for the corresponding non-schema attribute; and perform operations on the non-schema attributes of the object by accessing values of the non-schema attributes based on the names within the encoded strings in the value portions of the multivalue attribute.

\* \* \* \* \*